(12) United States Patent
Plaza

(10) Patent No.: US 10,250,468 B2
(45) Date of Patent: Apr. 2, 2019

(54) MANAGING FLEET OF OUTPUT DEVICES AND DETECTING CHANGE IN OPERATIONS THEREOF

(71) Applicant: Andy Plaza, Long Valley, NJ (US)

(72) Inventor: Andy Plaza, Long Valley, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 252 days.

(21) Appl. No.: 15/206,122

(22) Filed: Jul. 8, 2016

(65) Prior Publication Data

US 2018/0013642 A1    Jan. 11, 2018

(51) Int. Cl.
   G06F 15/173    (2006.01)
   H04L 12/26    (2006.01)
   H04L 12/24    (2006.01)

(52) U.S. Cl.
   CPC .......... H04L 43/065 (2013.01); H04L 41/12 (2013.01)

(58) Field of Classification Search
   CPC ....... H04N 2201/0094; H04N 1/00344; H04N 1/32507; H04N 1/32523; H04L 12/2807; H04L 41/046; H04L 41/0853; H04L 41/22; H04L 41/0253; H04L 41/0686; H04L 43/045; G06F 3/1288; G06F 3/1239; G06F 3/12
   See application file for complete search history.

(56) References Cited

U.S. PATENT DOCUMENTS

| 2010/0161673 | A1* | 6/2010 | Kandanala | G06Q 10/00 707/802 |
| 2012/0044088 | A1  | 2/2012 | Watanabe et al. | |
| 2012/0265865 | A1* | 10/2012 | Tanaka | H04L 41/044 709/223 |
| 2016/0105568 | A1* | 4/2016 | Yamashita | H04N 1/00204 358/1.14 |
| 2016/0285891 | A1* | 9/2016 | Byers | H04L 63/0884 |

OTHER PUBLICATIONS

U.S. Appl. No. 12/861,120, Atsushi Watanabe Andy Plaza, Device Management System, Method and Apparatus, Abandoned (US 2012/0044088 A1).
U.S. Appl. No. 14/740,912, Andy Plaza, System, Apparatus and Method for Managing Devices, pending.
U.S. Appl. No. 14/740,912, filed Jun. 16, 2015.

* cited by examiner

*Primary Examiner* — Hitesh Patel
(74) *Attorney, Agent, or Firm* — Cooper & Dunham LLP

(57) ABSTRACT

Systems, apparatuses, applications, methodologies and other tools for managing a fleet of output devices are configured to determine whether a substantial change in operations of the fleet of output devices has occurred, based on a comparison of a normal state of plural fleet metrics determined for the fleet over a predetermined period of time with a current state of the plural fleet metrics. When such a change is detected, an alert notification is generated and transmitted to a specified alert destination. Further, the alert notification may include a user-operable part to request a summary of the changes to the fleet as a whole or to operations of the fleet as a whole.

18 Claims, 18 Drawing Sheets

MANAGING FLEET OF OUTPUT DEVICES AND DETECTING CHANGE IN OPERATIONS THEREOF

TECHNICAL FIELD

This disclosure relates to systems, apparatuses, methodologies and other tools for managing a fleet of output devices, and more specifically, such tools including provisions to detect a substantial change in operations of the fleet of output devices.

BACKGROUND

In the current information age, information technology (IT) assets (e.g., hardware, software, database, etc.) are extensively used in enterprises and other organizations in order to facilitate processing of documents and data and to allow users to access other functionalities and devices (such as computers, printers, scanners, multi-function devices (MFDs) and other network-connected or standalone devices, etc.). However, while there have been many technical advances, IT systems are not yet fully automated and capable of self-maintenance, without human intervention. Thus, in each IT system, IT administrators typically monitor and manage the devices in the system.

Device management tools (such as application software, etc.) are available to enable the administrators to track, monitor and otherwise manage the devices from remotely. However, the number of networked devices that must be managed is generally increasing and the typical IT administrator is required to oversee a growing number of IT assets. Administrators typically focus on specific devices for which they receive a notification of a need for servicing or maintenance. However, in addition to such localized issues which an administrator can typically handle (with greater competence as the administrator gains experience, an administrator must also be concerned if there is a fleet-wide problem or circumstance. On the other hand, there is a dearth of conventional tools that provide automated monitoring for fleet-wide problems or issues.

SUMMARY

Various tools (for example, a system, an apparatus, application software, a method, etc.) can be configured to detect a substantial change in operations of a fleet of output devices. Such tools facilitate a new process of monitoring a fleet of output devices via various fleet metrics. That is, the tools disclosed herein allow for the detection of a substantial change in such fleet metrics (e.g., by comparison of current state to normal state), and then causes an alert notification to be generated and transmitted to a specified alert destination. Although such tools may notify upon a major swing in a single parameter, the alert circumstance in many instances may be based on a combination of multiple fleet metrics.

Such tools are particularly useful when the fleet of managed devices are subject to multiple changes on a regular basis, such as in operations, in configuration, etc. In such system, one or more servers or appliances or other data collection provisions may be provided to discover devices, collect data and detect and keep track of all changes, and when there is a large increase or decrease in various fleet metrics, such change is notified in a form of a dashboard and an alert to a notification destination. For example a device management application in the system can be configured (e.g., via user profiles) to display such notifications, information collected, a user interface for setting thresholds, etc., upon connection. The user interface may be configured to include, in addition to display of alert notifications, one or more dashboard gauges that show a comparison of normal state and current state for various fleet metrics.

BRIEF DESCRIPTION OF THE DRAWINGS

The aforementioned and other aspects, features and advantages can be more readily understood from the following detailed description with reference to the accompanying drawings wherein.

DETAILED DESCRIPTION OF EMBODIMENTS

Figure 1A:
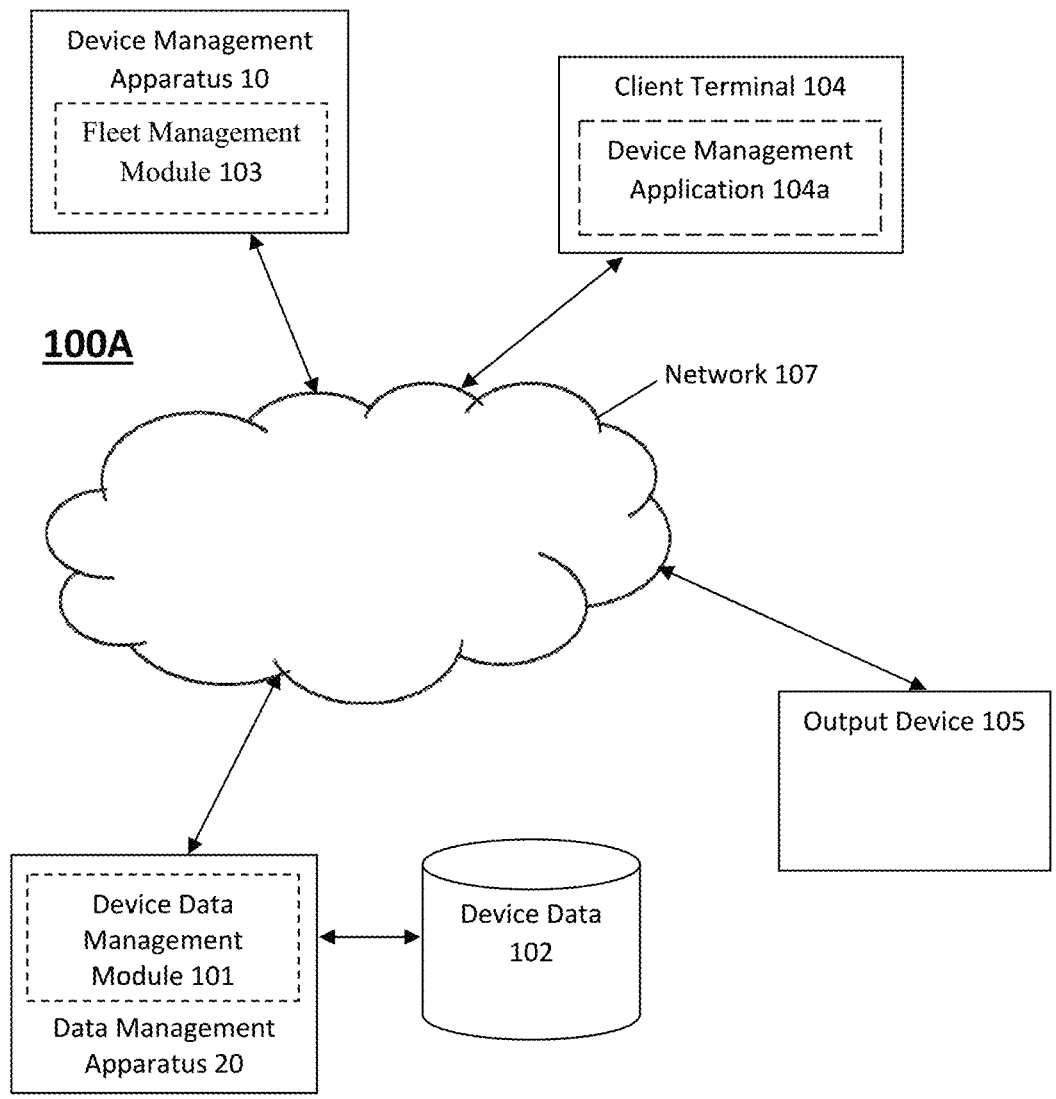
FIG. 1A shows a block diagram of a system that can include various provisions to manage a fleet of devices (e.g., output devices, etc.), according to an embodiment of this disclosure.

Various tools to facilitate device management are discussed herein, with reference to examples and embodiments. It should be appreciated by those skilled in the art that any one or more of such tools may be embedded in a device management application, server or system and/or in any of various other ways, and thus while various examples and embodiments are discussed herein, the inventive aspects of this disclosure are not limited to such examples and embodiments described herein.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of conventional functions and configurations is omitted from this specification when it may obscure the inventive aspects described herein.

Referring now to the drawings, wherein like reference numerals designate identical or corresponding parts throughout the several views, FIG. 1A shows schematically a system 100A that includes a data management apparatus 20, a device management apparatus 10, a terminal 104 that hosts a device management application 104a, and an output device 105. The data management apparatus 20, the device management apparatus 10, the terminal 104 and the output device 105 are connected to network 107.

The data management apparatus 20 includes a device data management module 101 that maintains a device data database 102. Otherwise, the data management apparatus 20 can be configured like a typical computing device, such as discussed infra with reference to FIG. 2.

In the embodiment shown in FIG. 1A, the device data management module 101 maintains the device database 102 and communicates with output devices (e.g., output device 105) via the network 107, to obtain device data from the output devices. After obtaining the device data, the device data management module 101 registers such device data into the device database 102. The device data management module 101 may perform one or more calculations based on the device data. For example, the device data management module 101 may conduct a statistical analysis of the device data. In another example the device data management module 101 may consolidate the device data received from one or more devices into a summary.

The device data registered in the device database 102 may include, for example, for each output device connected to the network 107, device properties information (e.g., device name, device model, device location, port, MAC address, IP address, etc.) and/or device operations information (e.g., print volume, color print volume, scan volume, device connection status, etc.). Further, the device data may also include analyzed device information, such as, for example, a summary (e.g., of print volume, total number of devices, total number of device by type, total usage, etc.) that corresponds to the fleet out of output devices (or for each device) for a predetermined period of time (e.g., one or more days, one or more weeks, one or more months, a year, etc.). In another example, the analyzed device information may also include statistical analysis (e.g., of print volume, total number of devices, total number of device by type, total usage, etc.) that corresponds to the fleet of output devices (or for each device) for a predetermined period of time.

The device management apparatus 10 can be configured by software on a typical computing device (such as discussed infra with reference to FIG. 2), to include a fleet management module 103. Such fleet management module 103 monitors a fleet of output devices and determines fleet metrics of the fleet as a whole. Such fleet metrics may be calculated based on (i) the device data stored in the device database 102 and/or (ii) device data collected from the fleet of output devices. The fleet metrics may correspond to a variety of categories. For example, fleet metrics may include values corresponding to number of output devices surpassing allocated print volume, percentage of print volume excess, number of output devices added to the fleet, number of service calls, number of managed devices disconnected from the network 107, etc.

After fleet metrics have been determined, the fleet management module 103 computes a current state value using the fleet metrics previously calculated. The fleet metrics may not all be the same units (e.g., meter, kilogram, ampere, kelvin, second, service calls, print volume, etc.) or even the same decimal unit prefix (e.g., milli, micro, kilo, mega, etc.). Thus, the fleet management module 103 may convert (or scale) such values corresponding to the fleet metrics into unit-less values. Such current state value can then be computed from such unit-less values. There may be other ways by which the fleet metrics can be converted into unit-less values.

Next, the current state value is compared with a predetermined alert threshold (that may be set by an administrator) to determine whether changes, if any, to the fleet or fleet operations exceed the predetermined alert threshold. If the changes are substantial enough (i.e. the current state value exceeds the predetermined alert threshold), the fleet management module sends out an alert notification to, for example, an alert destination (e.g., administrator, service provider, etc.). For example, the alert notification may notify of a substantial change in the fleet of output devices and/or the specifics of a detected problem or potential problem (e.g., too much printing performed, overloading network with too many devices, large number of disconnected devices, etc.).

A device management application 104a may be provided on or to the host terminal 104 to allow the user of the client terminal 104 to determine status of the fleet of output devices. Such application may be a native program installed on the host terminal 104, or may be provided from an external source as an application and/or as part of a platform, or may be provided as a service (e.g., software as a service, i.e. SaaS).

The information provided by the device management application 104a to the user may include, for example, the total number of devices in the fleet, device properties (e.g., device name, device model, device type, device ID, MAC address, IP address, etc.) of each device, device operations information (e.g., print volume, scan volume, consumables level, etc.), and summary information (e.g., print volume of fleet as a whole, total number of devices, total number of device by type, total usage, etc.).

Further, the user interface provided by the device management application 104a on the client terminal 101 may include a dashboard gauge that indicates current state fleet metrics and normal state fleet metrics. Current state fleet metrics indicate the fleet metrics are at the present moment, while normal state fleet metrics indicates the fleet metrics over a predetermined period of time (e.g., average value). Generally, current state fleet metrics are expected to be different from normal state fleet metrics by less than the threshold amount. The value compared to a threshold may be a difference between a current state value and the normal state value of a specific metric, or it may be a difference between current state and normal state as to a set of metrics. The current state fleet metrics may be represented as a graph (or chart) side-by-side with a graph (or chart) of the normal state fleet metrics.

In a case that there is substantial change in the fleet of output devices (i.e. current state value exceeds the predetermined alert threshold), the device management application 104a may present alert notifications that the client terminal 104 has received from the fleet management module 103. Such alert notifications may alternatively or additionally be presented via text, SMS, e-mail, social networking apps, etc. Thus, the alert notifications may be displayed nearly in real time on the client terminal 104. In another example, the user may retrieve such notifications (such as via the user interface of the device management application, or another application).

The output device 105 may be, for example, an MFP, a printer, a facsimile machine, a scanner, etc. Further, the terms "printer" and "printer device" are used hereinafter generically to include any output device having a printing or plotting functionality, and include multifunction devices having a copy and/or scanning functionality in addition to the printing or plotting functionality.

The network 107 can be a local area network, a wide area network or any type of network such as an intranet, an extranet (for example, to provide controlled access to external users, for example through the Internet), a private or public cloud network, the Internet, etc., or a combination thereof. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 1B:
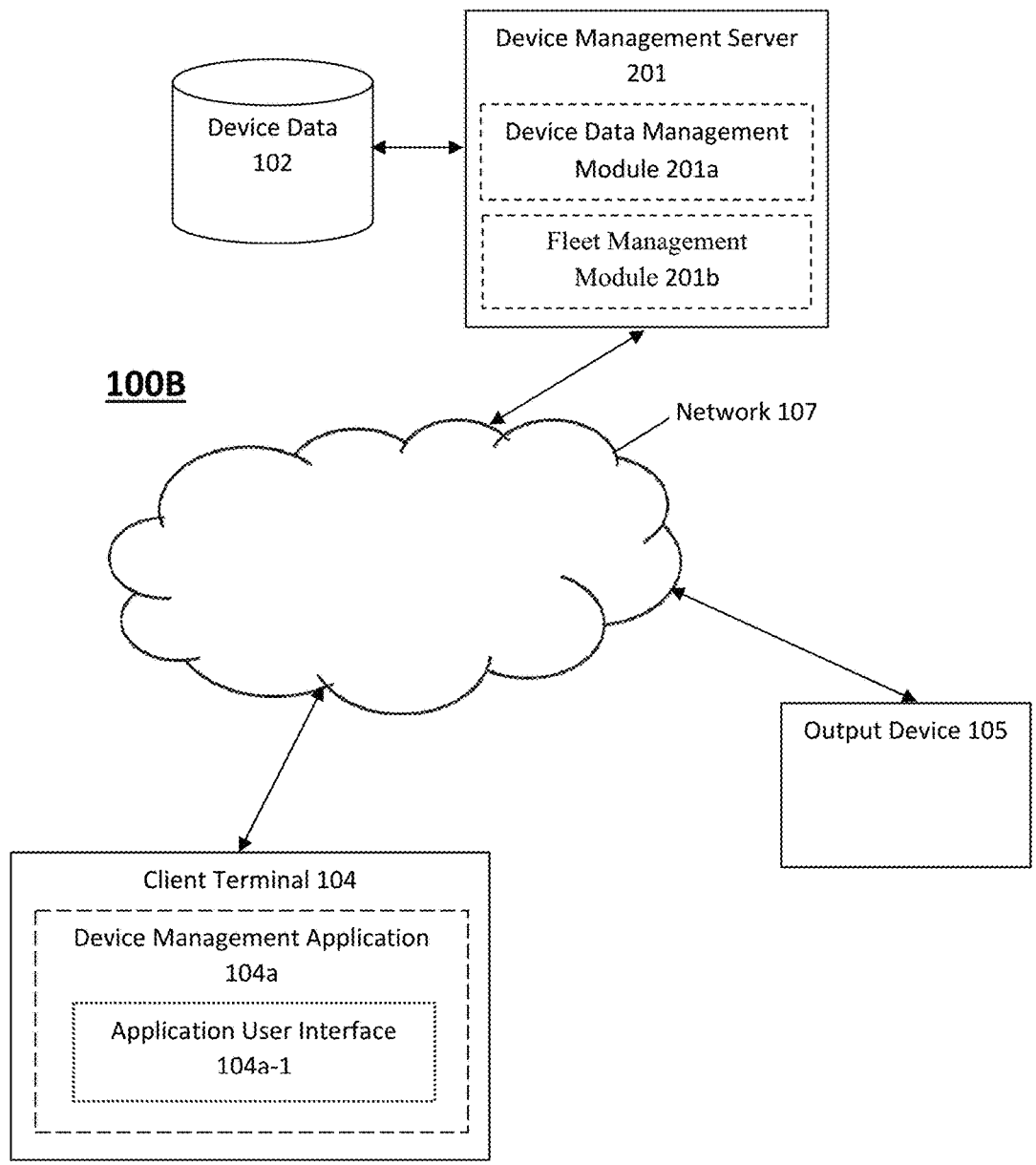
FIG. 1B shows a block diagram of a system that can include various provisions to manage a fleet of devices, according to another embodiment of this disclosure.

FIG. 1B shows schematically a system 100B, according to another embodiment. The system 100B is similar to the system 100A except that the system 100B includes a device management server 201 in place of data management apparatus 20 and device management apparatus 10.

The device management server 201a includes a device data management module 201a (similar to device data management module 101) and a fleet management module 201b (similar to fleet management module 103). It is not necessary to have the device data management module 201a and the fleet management module 201b be separated from each other. They can be combined inside the device management server 201 instead.

The application user interface 104a-1 displays to the user information that the device management application 104a receives from the device management server 201. For example, the device management application 104a may present a dashboard gauge via the application user interface 104a-1 on the client terminal. Such dashboard gauge may include a comparison between the normal state and the current state, as to fleet metrics, in the form of graphs, charts, tables, etc. In addition, the dashboard gauge may be manipulated by the user of the client terminal 104 to present information in a format that is preferred or needed by the user. Further, the dashboard gauge provided by the device management application 104a may also include means for the user to view information as to the fleet of devices, such as indicating substantial changes to fleet metrics.

Otherwise, operations of the elements of the system 100B are similar to those discussed in connection with corresponding elements of the system 100A of FIG. 1A.

Figure 1C:
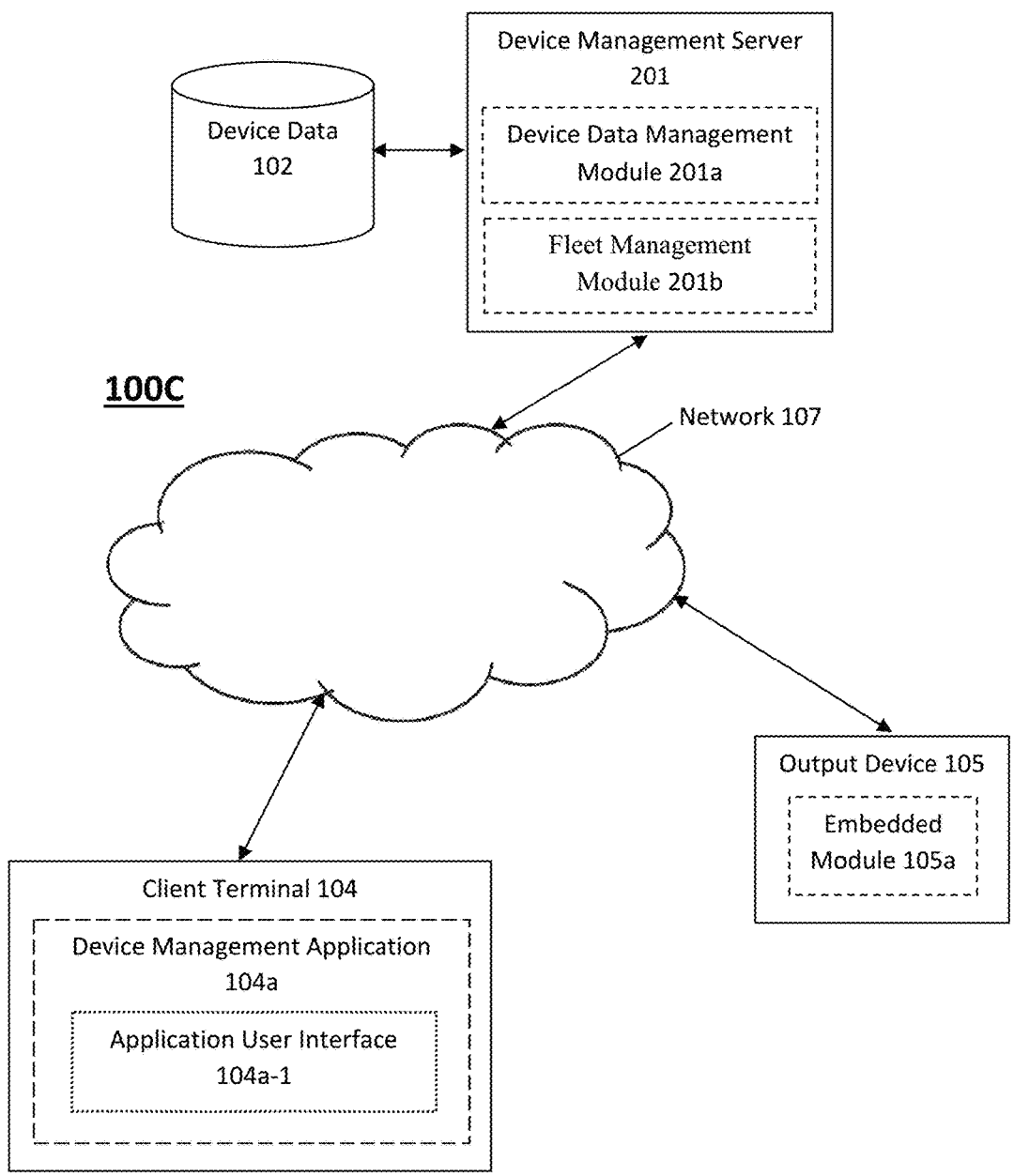
FIG. 1C shows a block diagram of a system that can include various provisions to manage a fleet of devices, according to another embodiment of this disclosure.

FIG. 1C shows schematically a system 100C for providing output (e.g., print, scan, copy, fax, etc.) services, according to another embodiment. The system 100C is similar to the system 100B except that in system 100C, module 105a is embedded in the output device 105.

The embedded module 105a may collect device data from the output device 105 and send the collected data to the device management server 201, with or without having stored the device data temporarily in local storage. The collected data may be provided to the device management server 201 on demand, based on a schedule or on another regular basis. Additionally or alternatively, the device management server 201 may communicate (either on demand or on a regular or scheduled basis) with the output device 105 to acquire device data from the output device 105. In response, the embedded module 105a may collect the request device data and send it to the device management server 201. In this case, it may be that the embedded module 105a does not stored the device data into the internal storage of the output device 105. Instead, the embedded module 105a sends the device data immediately to the device management server 201 after said device data has been collected without storing the device data afterwards.

Otherwise, operations of the elements of the system 100C are similar to those discussed in connection with corresponding elements of the system 100B of FIG. 1B.

Figure 1D:
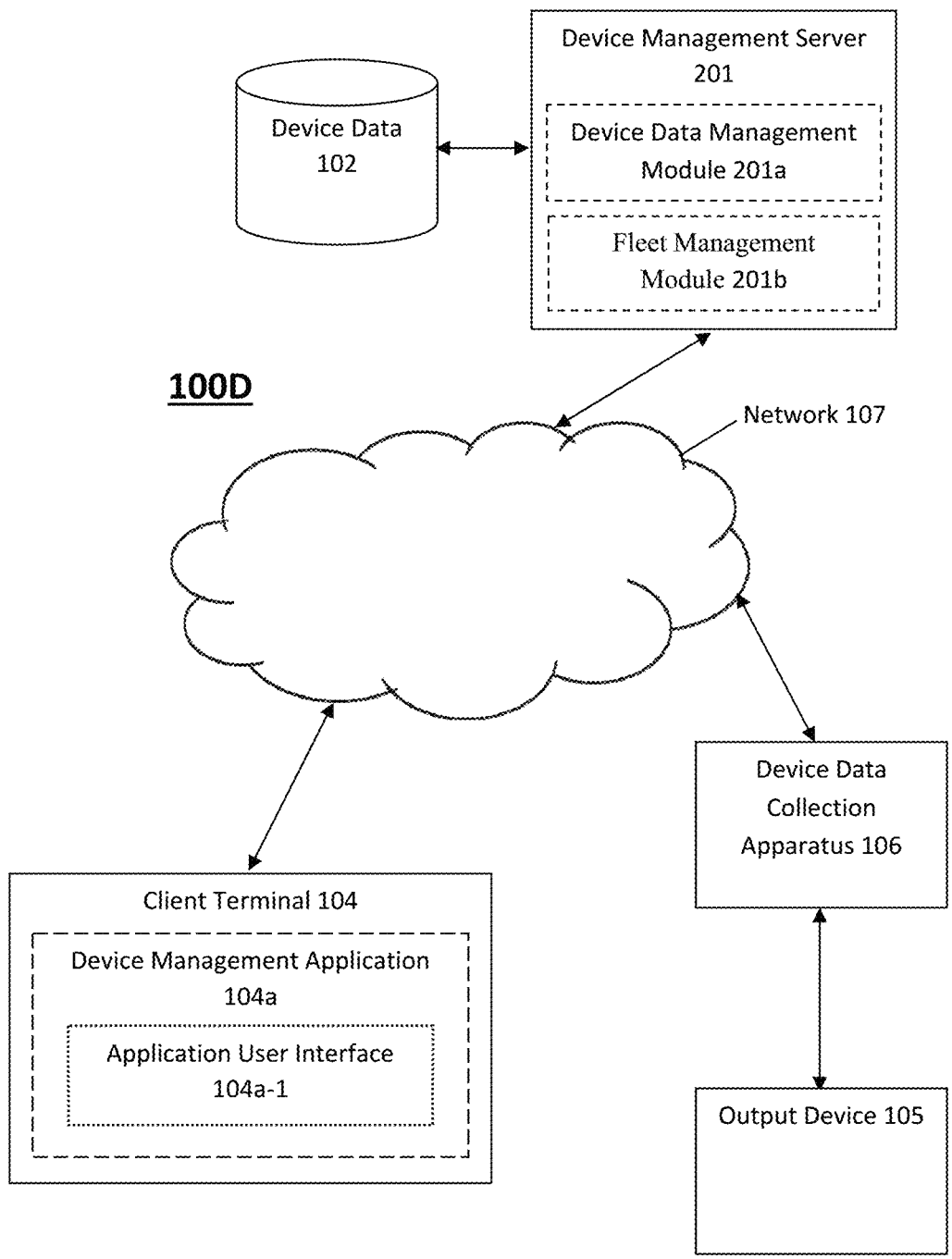
FIG. 1D shows a block diagram of a system that can include various provisions to manage a fleet of devices, according to another embodiment of this disclosure.

FIG. 1D shows schematically a system 100D, according to another embodiment. The system 100D is similar to the system 100B except that system 100D additionally includes a device data collection apparatus 106 and the output device 105 is not connected to the network 107 in any way.

The device data collection apparatus 106 may obtain information (e.g., device data) on demand or on a regular or scheduled basis from each of the output devices (e.g., 105) to which the device data collection apparatus 106 is connected. For example, the device data collection apparatus 106 may manage a plurality of output devices that correspond to a particular grouping (e.g., physical location, department, device model, device type, etc.) and collect relevant data from each of the output devices. In another embodiment, after collecting the relevant data from each of the output devices, the device data collection apparatus 106 may send the collected data to the device management server 201. In another embodiment, the device data collection apparatus 106 may parse through the collected data and send only data that the device data collection apparatus 106 has determined to be pertinent to the device management server 201.

Otherwise, operations of the elements of the system 100D are similar to those discussed in connection with corresponding elements of the system 100B of FIG. 1B.

Figure 2:
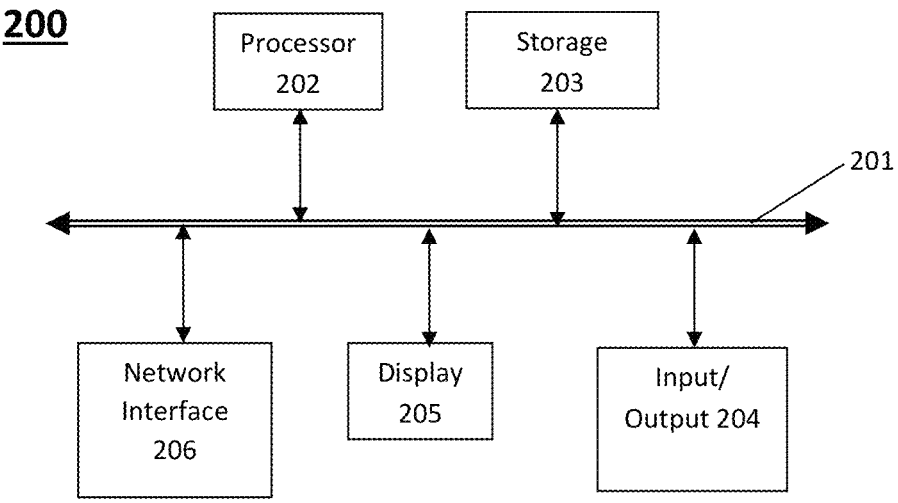
FIG. 2 shows a block diagram of an example of a configuration of a computing device that can be configured by software to operate as a device management apparatus or device management server.

FIG. 2 shows an exemplary constitution of a computing device that can be configured (for example, through software) to operate (at least in part) as a data management apparatus (e.g., 20 in FIG. 1A), a device management apparatus (e.g., 10, in FIG. 1A), and/or a device management server (e.g., 201, in FIGS. 1B, 1C, 1D). In FIG. 2, apparatus 200 includes a processor (or central processing unit) 202 that communicates with a number of other components, including memory or storage device 203, other input/output (e.g., keyboard, mouse, etc.) 204, display 205 and network interface 206, by way of a system bus 201. The apparatus 200 may be a special-purpose device (such as including application specific integrated circuits or an appropriate network of conventional component circuits) or it may be software-configured on a conventional personal computer or computer workstation with sufficient memory, processing and communication capabilities to operate as a terminal and/or server, as should be appreciated by those skilled in the relevant art. The processor 202, memory/storage 203, input/output 204, display 205 and network interface 206 are conventional, and therefore in order to avoid obfuscating the inventive aspects of this disclosure, such conventional aspects are not discussed in detail herein.

The apparatus 200 includes the network interface 206 for communications through a network, such as communications through the network 107. However, it should be appreciated that the subject matter of this disclosure is not limited to such configuration. For example, the apparatus 200 may communicate with user terminals through direct connections and/or through a network to which some components are not connected. As another example, the apparatus 200 does not need to be provided by a server that services terminals, but rather may communicate with the devices on a peer basis, or in another fashion.

The apparatus 200 of the present disclosure is not limited to a server or computer, but can be manifested in any of various devices that can be configured to communicate over a network and/or the Internet.

Figure 3:
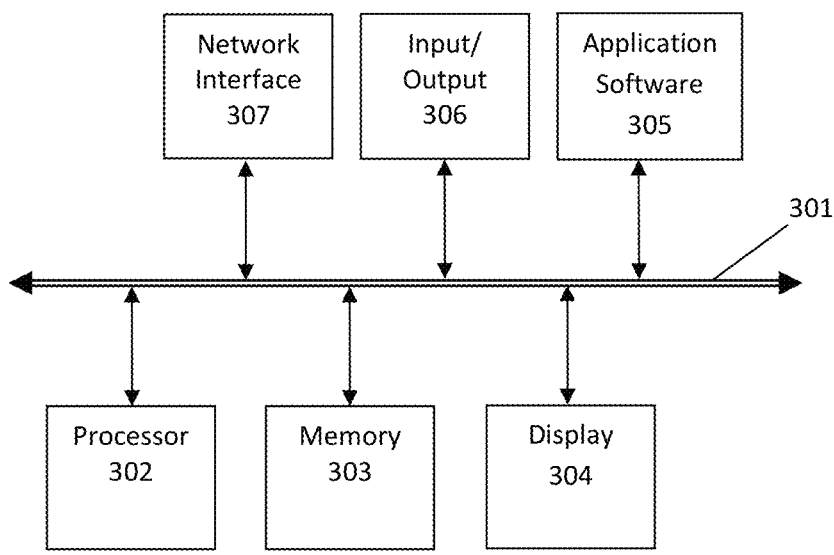
FIG. 3 shows a block diagram of an example of a configuration of a host terminal for a device management application.

The terminal 104 (FIGS. 1A-1D) can be any computing device, including but not limited to a tablet or notebook computer, a workstation computer, a PDA (personal digital assistant), a mobile phone or handset, another mobile information terminal, etc., that can communicate with other devices through the network 107. An exemplary constitution of the client device 104 of FIGS. 1A-1D is shown schematically in FIG. 3. In FIG. 3, terminal 300 includes a processor (or central processing unit) 302 that communicates with various other components, such as memory (and/or other storage device) 303, display 304, application software 305, input/output (such as keyboard, mouse, touchpad, stylus, microphone and/or speaker with voice/speech interface and/or recognition software, etc.) 306 and network interface 307, by way of an internal bus 301.

The memory 303 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 307 provides a connection (for example, by way of an Ethernet connection or other network connection which supports any desired network protocol such as, but not limited to TCP/IP, IPX, IPX/SPX, NetBEUI, etc.) to the network to which the computer 300 is connected (e.g., network 107 of FIGS. 1A-1D).

Additional aspects or components of the computer 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, jr. and Les Freed (Que Corporation 2000), the entire contents of each of which are incorporated herein by reference.

Figure 4:
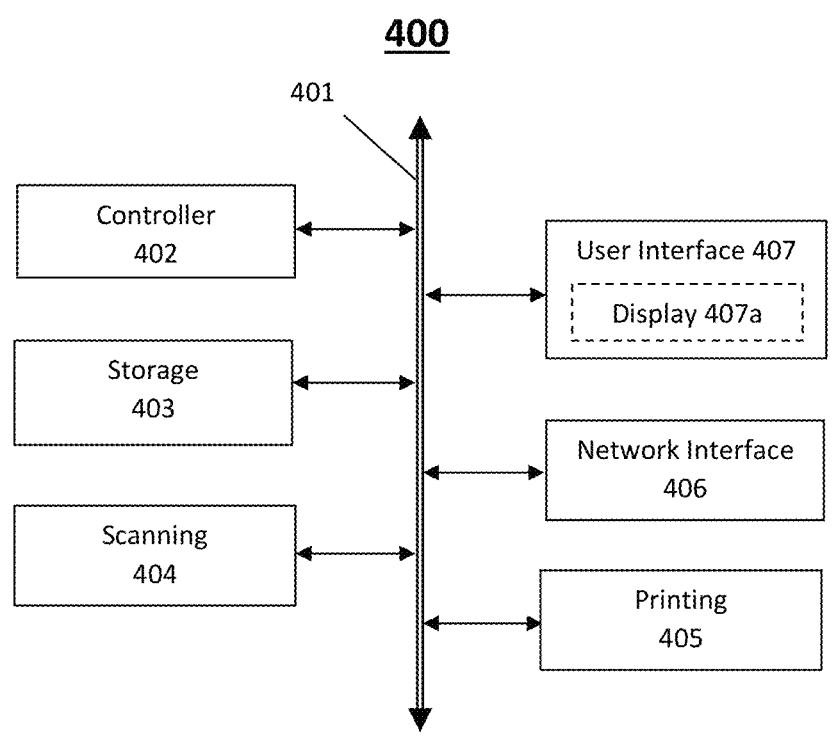
FIG. 4 shows a block diagram of an example of a configuration of a multi-function output device.

FIG. 4 shows a schematic diagram of a configuration of an output device as an MFP (multi-function printer or multi-function peripheral) device. The output device 400 shown in FIG. 4 includes a controller 402, and various elements connected to the controller 402 by an internal bus 401. The controller 402 controls and monitors operations of the output device 400. The elements connected to the controller 402 include storage 403 (for example, random access memory, read-only memory, hard disk drive, portable storage media drive such as for optical discs, magnetic discs, magneto optical discs, etc., semiconductor memory cards, combinations of storage media, etc.), scanning 404, printing 405, a network interface (I/F) 406, a user interface 407.

Storage 403 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 403 and executed by the controller 402 to carry out the instructions. Such instructions can include instructions for performing specified functions (such as printing, scanning, faxing, copying, e-mailing, etc.) of the output device 400, to enable the output device 400 to interact with a terminal, as well as perhaps other external devices, through the network interface 407, and interactions with users through the user interface 407.

The network interface 406 is utilized by the output device 400 to communicate via a network with other network-connected devices such as a terminal, a server and receive data requests, print (or other) jobs, user interfaces, and etc.

The user interface 407 includes one or more electronic visual displays that display, under control of controller 402, information allowing the user of the output device 400 to interact with the output device 400. The electronic visual display can be any of various conventional displays (such as a liquid crystal display, a plasma display device, a cathode ray tube display, etc.), and may be a touch sensitive display (for example, liquid crystal display) and is configured to provide a GUI (graphical user interface) based on information input by an operator of the output device 400, so as to allow the operator to interact conveniently with services provided by or on the output device 400, or with the output device 400 serving as terminal for accessing electronic data or other content through the network. User interfaces or other contents received through the network via the network interface 406 can be displayed on the display screen.

Scanning 404, printing 405, and network interface 406 are otherwise conventional, and therefore, a detailed description of such conventional aspects is omitted in the interest of clarity and brevity. The output device 400 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 5:
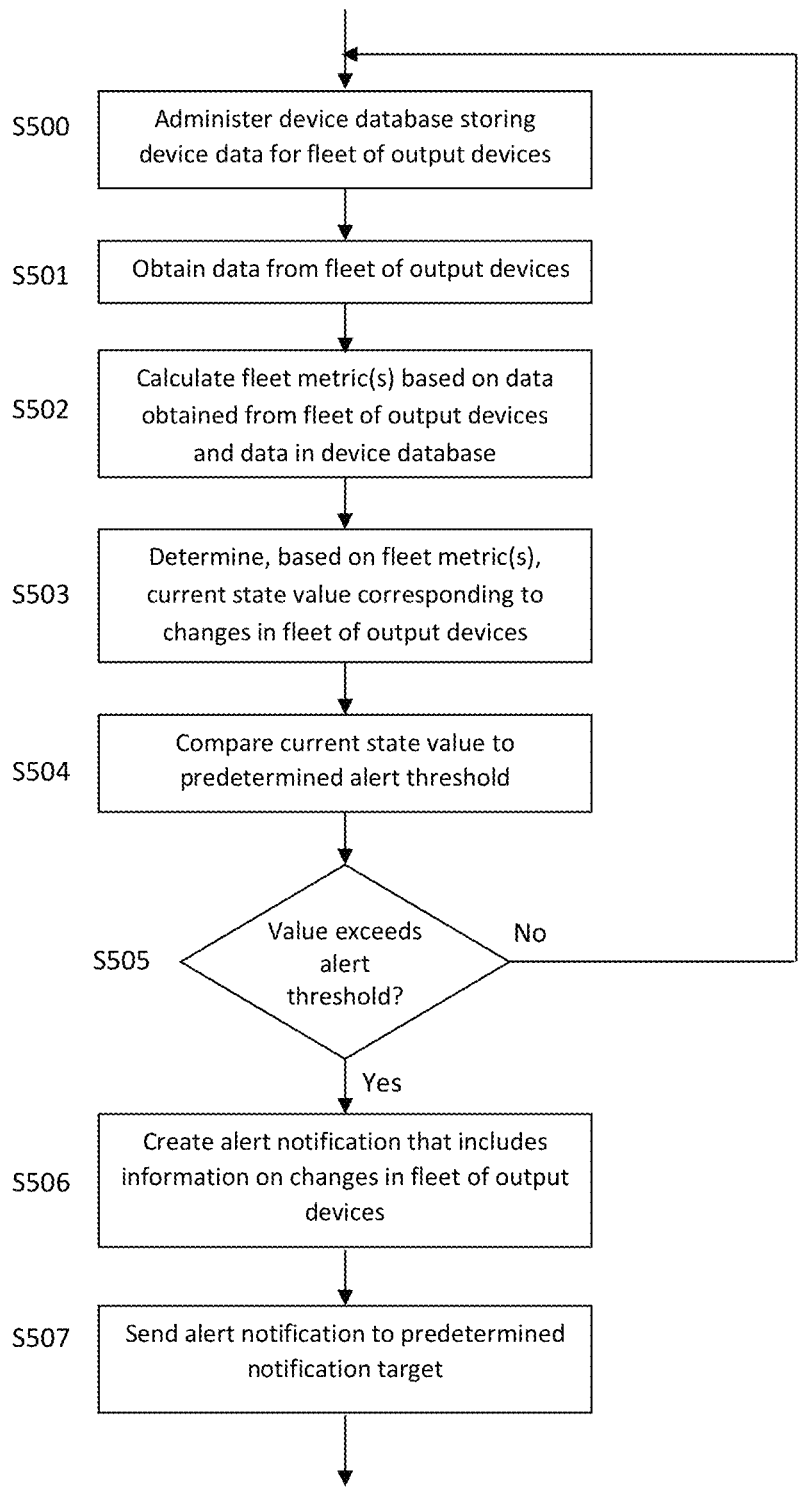
FIG. 5 shows a flow chart of a method that can be performed in any of the systems shown in FIGS. 1A-1D (or an equivalent)

FIG. 5 shows a method that can be performed by or with a device management server (e.g.,201a).

The device management server may maintain a device database that registers data corresponding to a fleet of output devices (S500). Such data for each output device in the fleet may include, for example, information such as device properties (e.g., device model, device type, device name, MAC Address, IP Address) and device operations data (e.g., print volume, etc.). In another example, the data may also include a summary of the device properties for the entire fleet, a summary of operations data for the entire fleet, statistical analysis of the fleet, recently added devices to the fleet, etc.

Periodically (e.g., daily, every two or more days, weekly, monthly, yearly, etc.), the device management server may determine whether there are any substantial changes to the fleet of output devices, or operations thereof, such as may negatively impact the fleet. For example, freely adding output devices to the network connecting the fleet of output devices may be problematic in that the network may be overloaded, potentially causing a slowdown in communications. In another example, users may be overusing one or more devices in the fleet, causing the allocated printing volume to be exceeded, thereby significantly limiting the remaining life of the overused output devices. When such changes or modifications can possibly negatively impact the fleet as a whole, it may be necessary that an administrator be notified.

Thus, to begin the process of determining whether any substantial changes to the fleet of output device, the device management server may obtain, via a network (e.g., 107), data for each device in the fleet (S501). For example, the data may be obtained from the device and would be a more recent version of the data registered in the device database (which may be considered to be stale data). After the device management server obtains data from the device or retrieves the data from the device database, the device management server calculates fleet metrics using the recently obtained data and the data stored in the device database (S502). The fleet metrics may include, but is not limited to, (i) print volume of the fleet as a whole over a particular period of time, (ii) number of devices in the fleet that are have been recently discovered over a particular period of time, (iii) number of devices in the fleet that are have been recently disconnected over a particular period of time and (iv) number of service calls associated with output devices in the fleet. For example, the device management server may generate one or more values that corresponds to (i), (ii), (iii) and (iv), by using the recently acquired data from the output devices and the data stored in the device database.

After calculating one or more fleet metrics, the device management server may then determine a current state value based on the one or more fleet metrics (S503). Such current state value may be, for example, a single index representing the changes in the output fleet of devices and calculated in any of various ways, such as using a numerical approach, a blackbox approach, a neural network, etc.

An example of a numerical approach may employ the following formula (although another numerical approach may alternatively be used).

current state value=SQRT{[(CFM$_1$–FM$_1$)$^2$/FM$_1$]+ . . . +[(CFM$_N$–FM$_N$)$^2$/FM$_N$]} where CFM$_1$, . . . , CFM$_N$ are current state fleet metrics 1 through N (N being a positive integer), and FM$_1$, . . . , FM$_N$ are average values of fleet metrics 1 through N To determine whether there is a substantial change, the device management server compares the current state value to a predetermined alert threshold (S504). In one example, such predetermined alert threshold may be a predetermined value that may be set by the administrator. In the case that the current state value does not exceed the predetermined alert threshold (S505, no), the device management server may determine that there are no substantial changes and return to its other processing, until the next predetermined period in which the device management server determines, once again, whether there are any substantial changes to the fleet of output devices.

Figure 6:
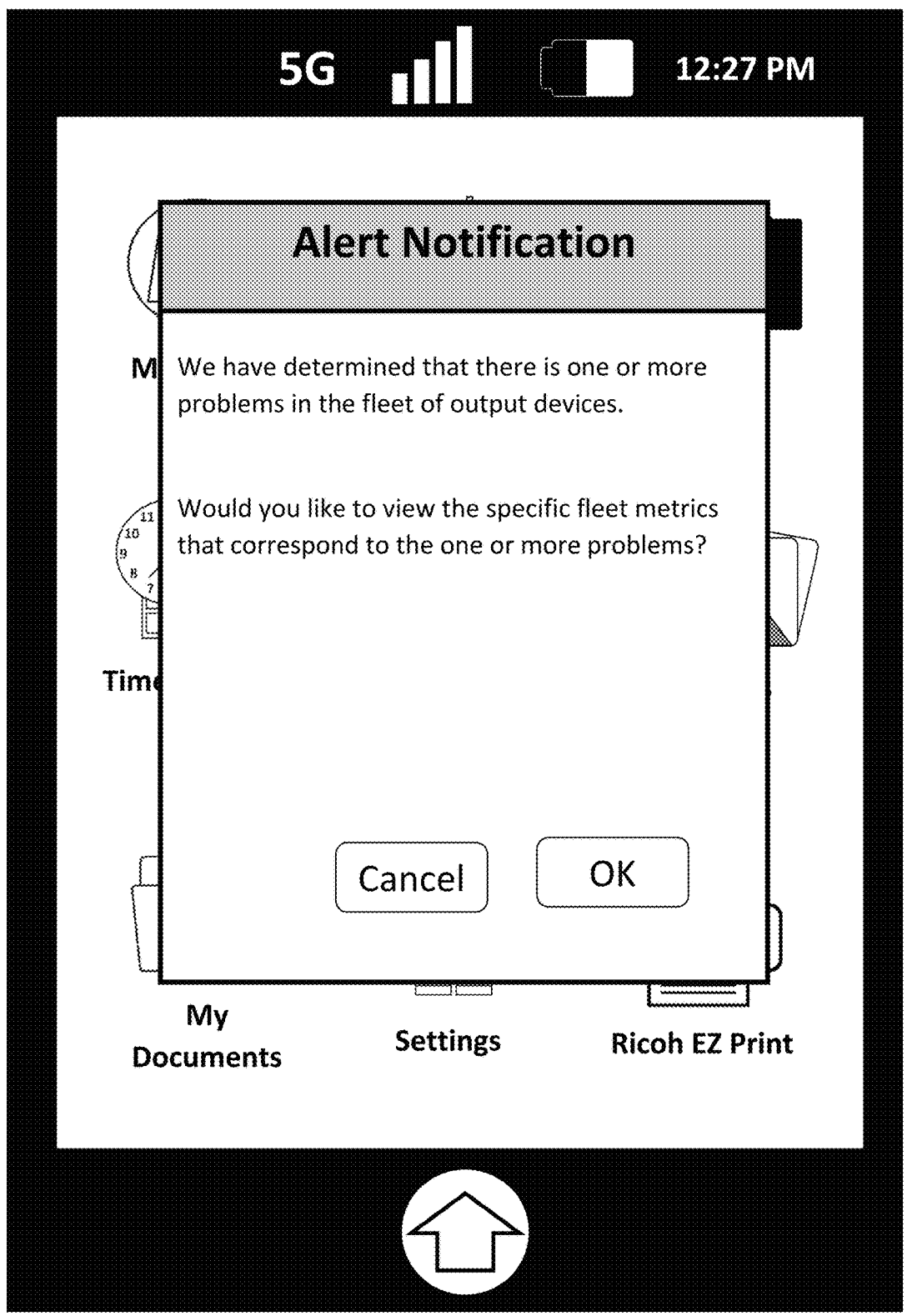
FIG. 6 shows an example of an alert notification provided in a device management application, in any of the systems shown in FIGS. 1A-1D (or an equivalent)

On the other hand, in the case that the current state value does exceed the predetermined alert threshold (S505, yes), the device management server creates an alert notification that includes information regarding modifications to the fleet of output devices (S506). Next, the device management server sends the alert notification to a targeted destination informing a user that there is been a substantial change in the fleet (S507). For example, such targeted destination may be a client terminal belonging to the user, as shown in FIG. 6.

In another example (FIG. 7), the device management server may determine if there is any substantial modifications to fleet operations, by comparing the current state of the fleet to the normal state of the fleet. The normal state of the fleet may be based on fleet data over a specified period of time, and such normal state may change depending on the timeframe that is used to determine the normal state. The data that is used to determine the normal state of the fleet may be stored in a device database, or may be obtained from the devices periodically or in a continuous manner.

Figure 7:
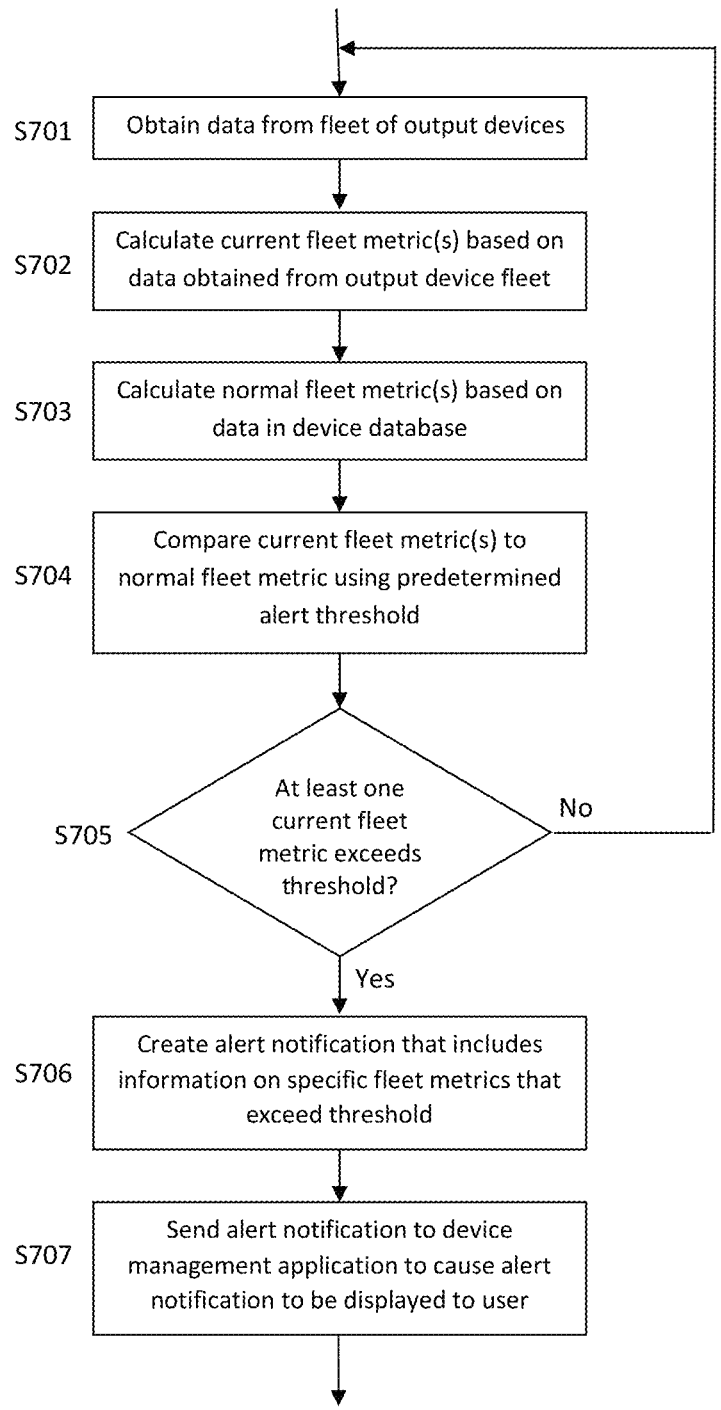
FIG. 7 shows a flow chart of a method that can be performed in any of the systems shown in FIGS. 1A-1D (or an equivalent)

In the method shown in FIG. 7 which can be performed by or with a device management server (e.g., 201a) to determine whether there is a substantial change to fleet data, the device management server may obtain, via a network (e.g., 107), data from each of the output devices in the fleet (S701). The obtained data, for example, may correspond (e.g., a more recent version) to the data registered in the device database. The device management server may retrieve such data since the data in the device database may be outdated. After obtaining the data, the device management server calculates current state fleet metrics using the recently obtained data (S702). The fleet metrics may include, but is not limited to, (i) print volume of the fleet as a whole over a particular period of time, (ii) number of devices in the fleet that are have been recently discovered over the period of time, (iii) number of devices in the fleet that are have been recently disconnected over the period of time, (iv) number of service calls over the period of time, etc. The device management server may generate one or more values based on the fleet metrics, by using the recently acquired data from the output devices.

After calculating the current state values, the device management server may then calculate corresponding normal state values [e.g., (i) through (iv)] based on the data obtained from the device database (S703). The normal state fleet metrics may be calculated by (i) determining a timeframe (e.g., a year) that may be predetermined and (ii) computing the average values (e.g., print volume for that year) that are within such timeframe. That is, the average values may be considered to represent the normal state in the fleet of output devices. The normal state fleet metrics may be of different values depending on the timeframe set. For example, setting the timeframe to a particular month may reveal that there have been an abundant of service calls. On the other hand, setting the timeframe to a year (including the particular) month may indicate that there have been not too many service calls.

After calculating both the current state fleet metric and the normal state fleet metric, the device management server compares the calculated one or more current state fleet metrics to the calculated one or more normal state fleet metric by using a predetermined alert threshold (S704).

For example, the normal state fleet metrics may indicate that the print volume of the fleet has averaged at 10,000 for a month, while the current state fleet metrics may indicate that the print volume of the fleet over the past month is 10,500. It may be considered that there is no need to inform an administrator since the 5% difference does not warrant further attention (such as when a substantial difference between the normal state and the current state exceeds a predetermined threshold, such as 20%, 30%, 50%, 200%, etc.). When a value corresponding to such substantial difference exceeds a predetermined threshold, such difference suggests that a change in the fleet necessitating user notification has taken place.

For example, the device management server may determine that there is a substantial change for a fleet metric corresponding to a service call when the difference between the number of service calls in the normal state fleet metric and the number of service calls in the current state fleet metric exceed the predetermined alert threshold which is "30" in this case. Thus, in some instances, the normal state fleet metrics may indicate that there have been "10" service calls for the past year for the entire fleet, while the current state fleet metric indicates that there has been "15" service calls since the last time that data was obtained from the fleet of output devices and stored in the device database, the device management server indicates that there has been no modification since the difference value ("5") does not exceed the predetermined alert threshold ("30"). On the other hand, in a case that the current state fleet metric indicates that there has been "50" service calls since the last time that data was obtained from the fleet of output devices and stored in the device database, the device management server indicates that there has been a substantial change since the difference ("40") exceeds the predetermined alert threshold ("30").

In the case that none of the comparisons between normal state fleet metrics and current state fleet metrics indicate a substantial change to the fleet of devices (S705, no), the device management server returns to its other processing, until the next predetermined period in which the device management server determines, once again, whether there are any substantial changes to the fleet of output devices. On the other hand, in the case that the current state value does exceed the predetermined alert threshold (S705, yes), the device management server creates an alert notification that includes information regarding specific fleet metrics that have exceeded the predetermined alert threshold (S706) and sends such notification (S707).

The device management server may include in the alert notification information regarding only those fleet metrics that have difference values which exceed the predetermined alert threshold, and thus the person who receives the alert notifications may not be overwhelmed by the amount of information corresponding to the fleet metrics, and may simply view the specific fleet metrics that have substantial changes.

Figure 8A:
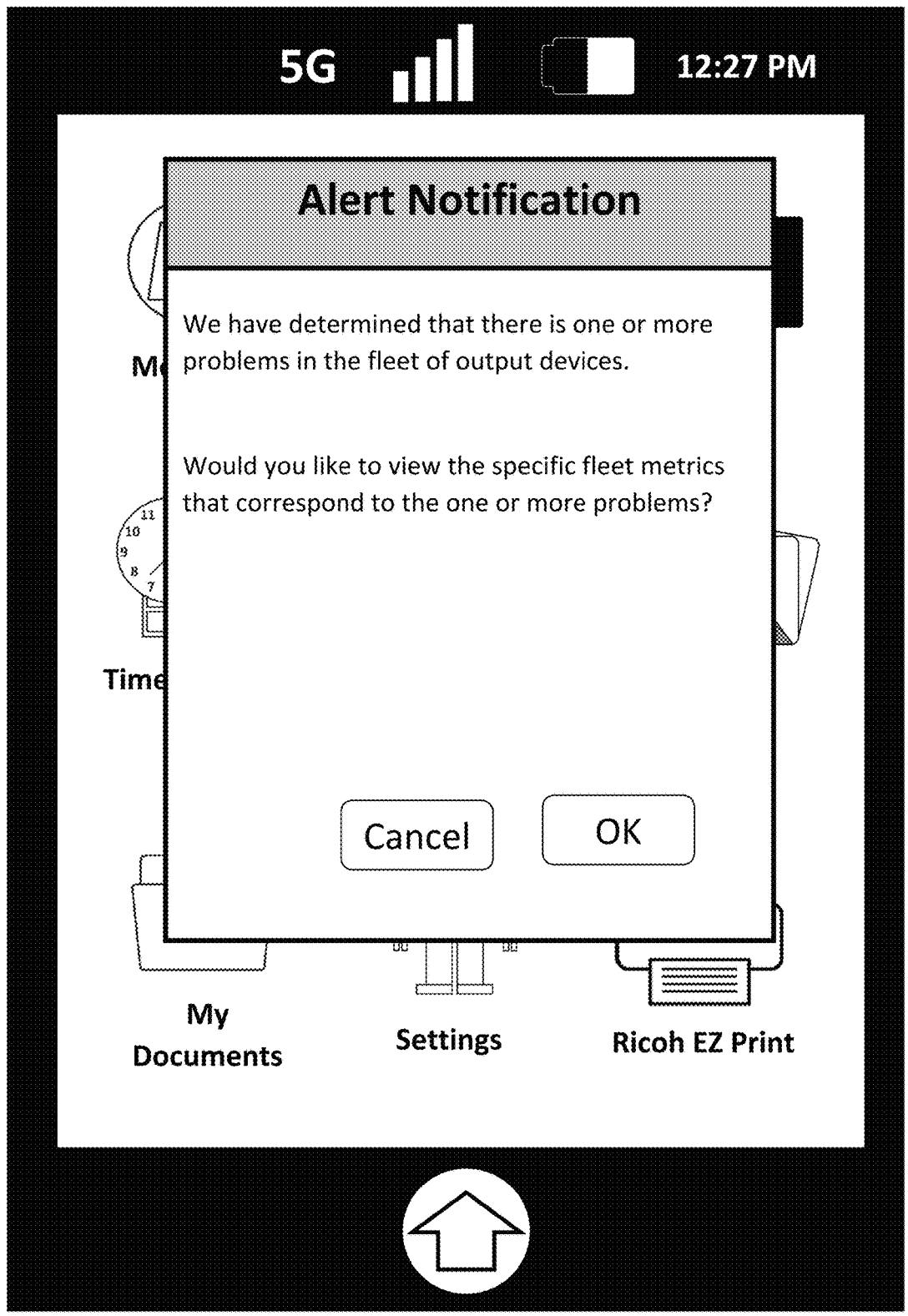
FIGS. 8A and 8B show examples of user interface screens provided by a device management application, in any of the systems shown in FIGS. 1A-1D (or an equivalent)
Figure 8B:
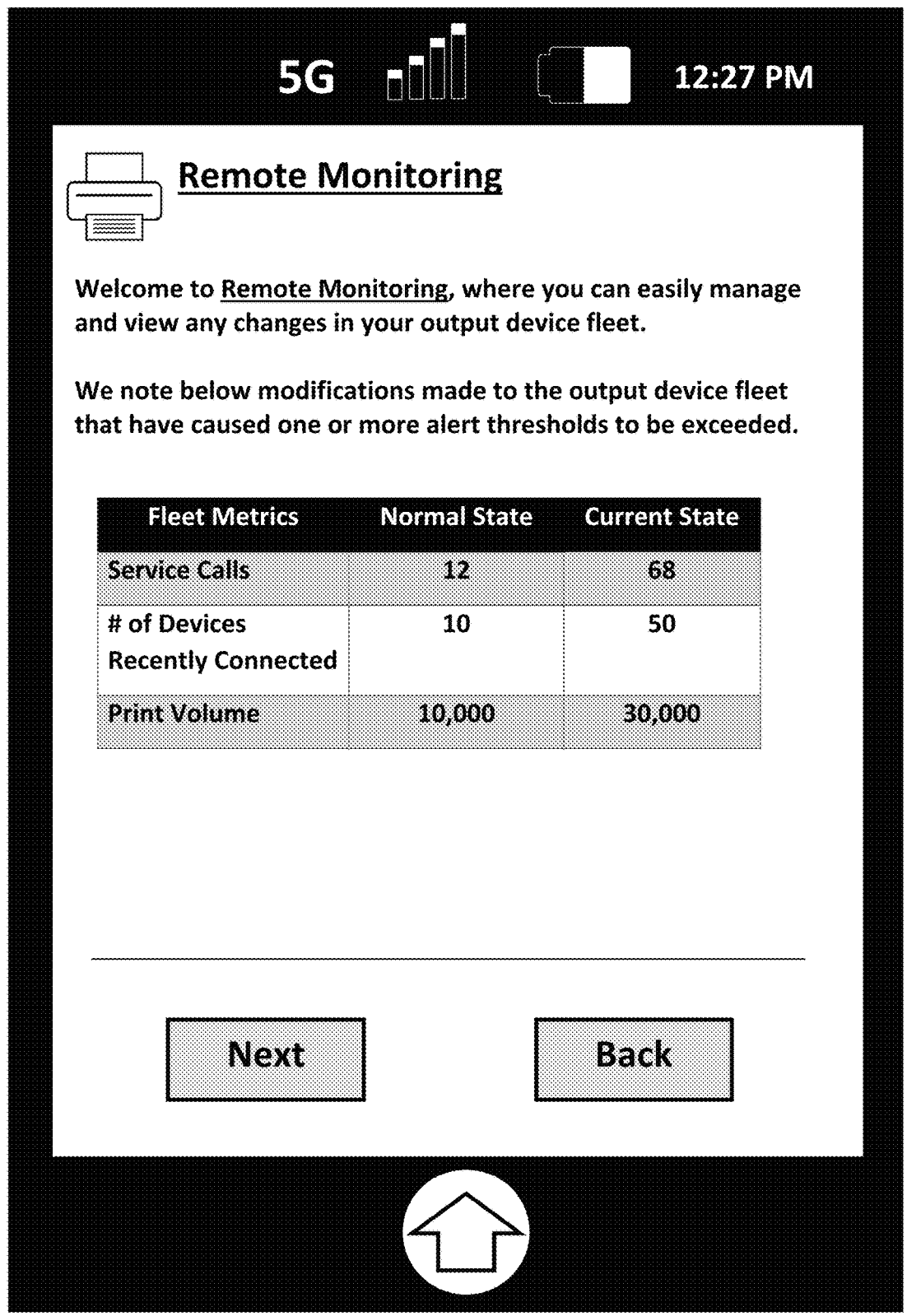

The alert notification may be a message that instantly appears on a screen of the client terminal, such as shown in FIG. 8A. The alert notification may inform the user of the client terminal that there are one or more problems in the fleet indicated by the calculated fleet metrics. Further, the alert notification may inform the user he or she may view these problems in detail by activating the "OK" button. In the case that the user activates the "OK" button, the device management application may cause a screen such as shown in FIG. 8B. As can be seen, not all of the fleet metrics that have been computed are shown to the user of the client terminal. Instead, only fleet metrics whose values cause the predetermined alert threshold to be exceeded are shown to the user. By presenting only relevant fleet metrics, the user may not be overwhelmed since there may be numerous fleet metrics. Further, the user of the client terminal may be shown the normal state fleet metrics and the current state fleet metrics. The normal state fleet metrics, for example, may include the average values of fleet metrics taken for the months of April 2015-June 2015 while the current state fleet metrics may include the average values of fleet metrics taken for the month of July 2015. In another embodiment, the current state fleet metrics may include the average values since the last time fleet metrics were calculated and recorded.

Figure 9:
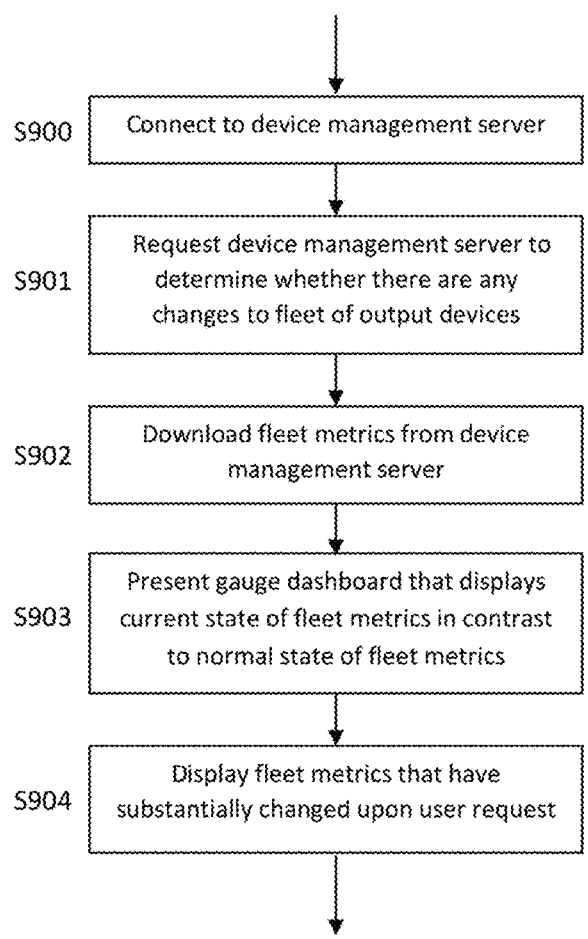
FIG. 9 shows a flow chart of a method that can be performed in any of the systems shown in FIGS. 1A-1D (or an equivalent)

FIG. 9 shows a method that can be performed by or with a device management application (e.g., 101a) on a client terminal (e.g., 101), according to an embodiment.

Whenever the client terminal connects with the device management server (e.g., 201) (S900), the device management application may request that the device management server determine whether there are any changes to the fleet of output devices (S901). Such determination may be automated and transparent to the user. That is, the device management application may make the request automatically every time the client terminal connects with the device management server. Further, such determination may also include calculating the fleet metrics (both normal and current). After performing the request, the client terminal may download the fleet metrics after the device management server has finished performing the determination and calculations (S902). In another embodiment, the device management application does not request the device management server to determine whether there are any changes to the fleet of output devices, and instead, the device management application immediately downloads the fleet metrics from the device management server.

Figure 10A:
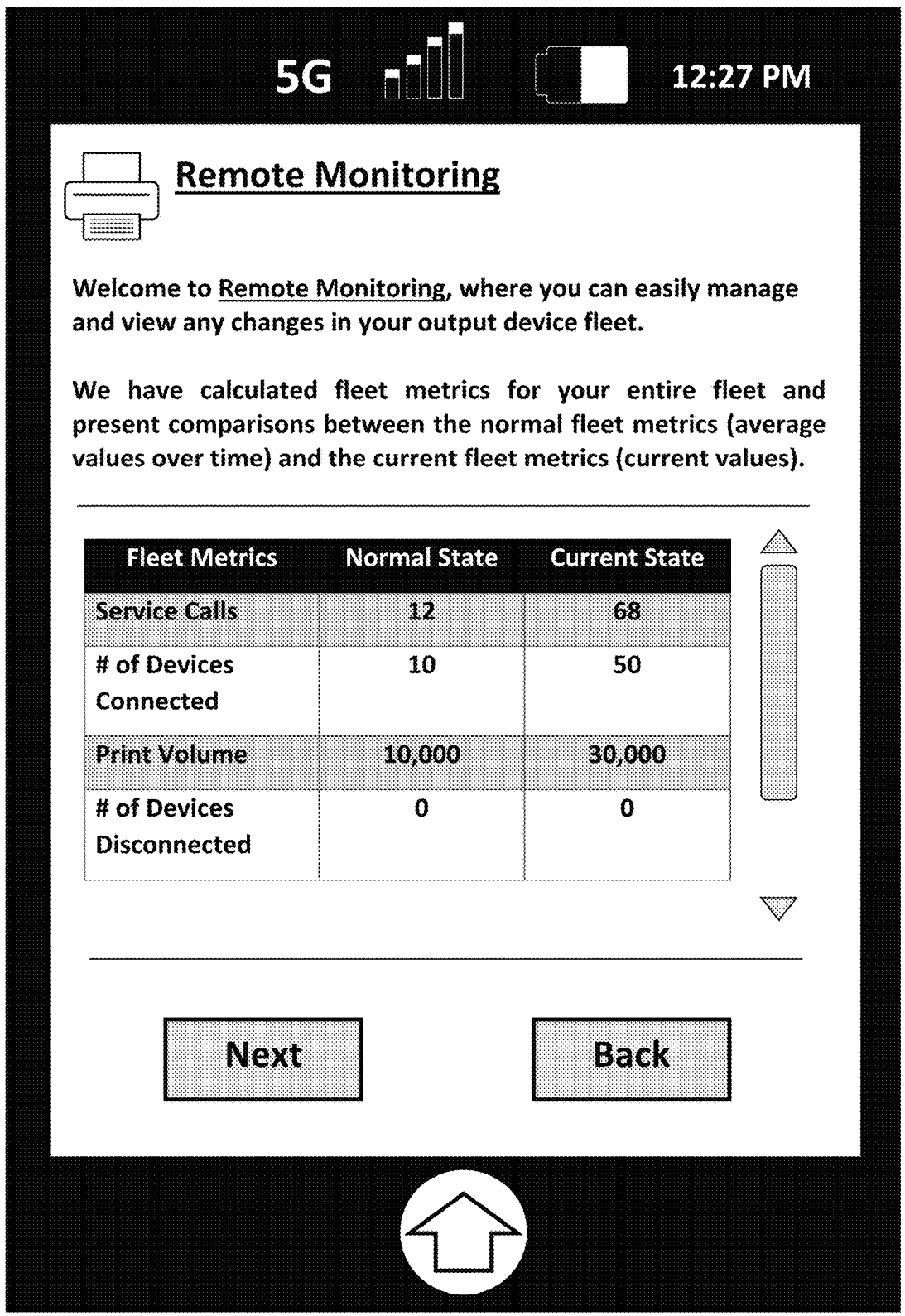
FIGS. 10A-10E show examples of user interface screens provided by a device management application, in any of the systems shown in FIGS. 1A-1D (or an equivalent)
Figure 10B:
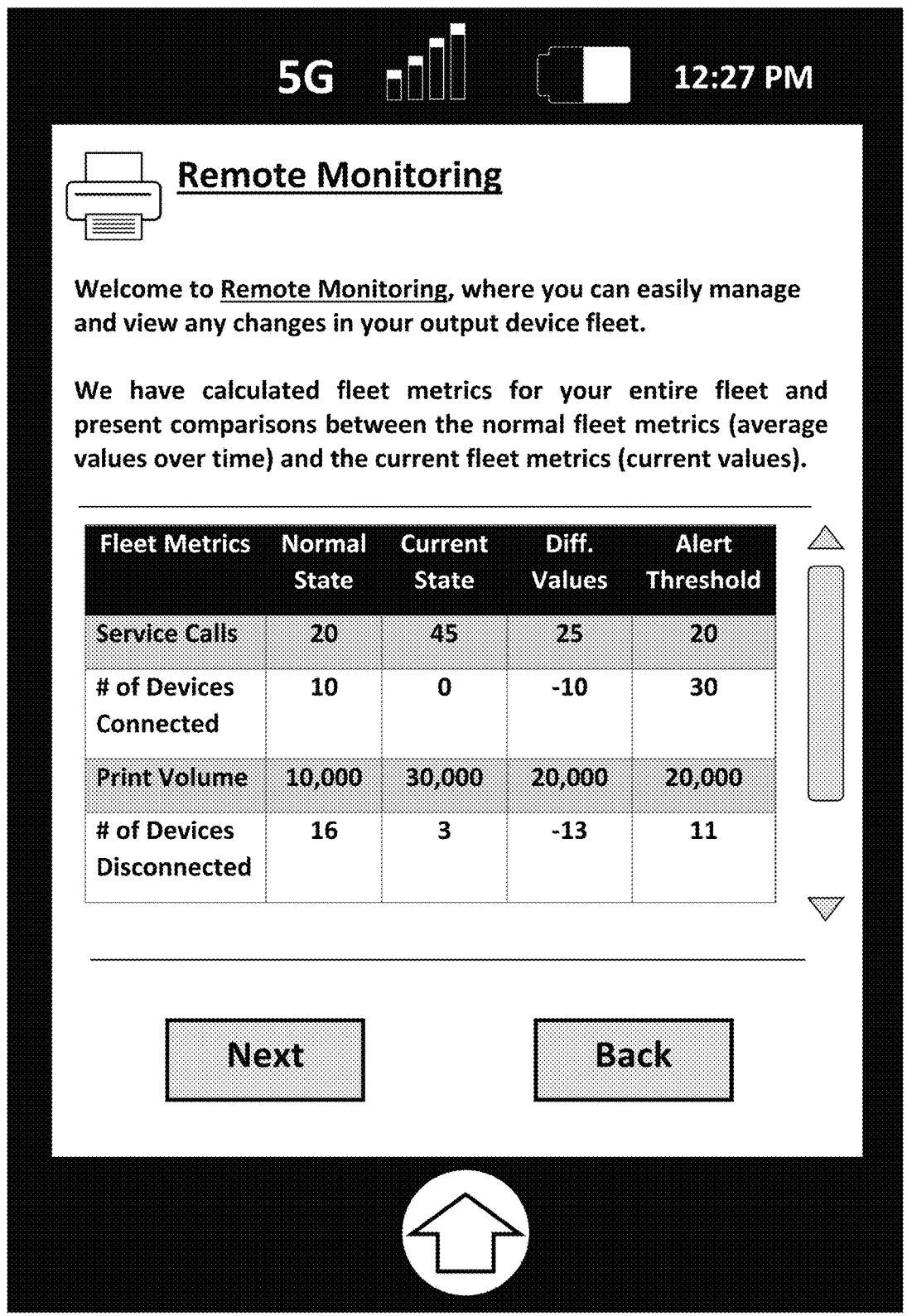

Next, after receiving the fleet metrics from the device management server, the device management application presents a dashboard gauge on a user interface screen (S903), such as shown in FIG. 10A. Such dashboard gauge may include a comparison between the normal state fleet metrics and the current state fleet metrics in the form of graphs, charts, tables, etc. In another embodiment, the device management application may present the fleet metrics (normal state and current state), the difference values between the normal state and current state, and the alert threshold, such as shown in FIG. 10B. Such difference value may be a negative value, so as to illustrate how the changes have occurred.

Figure 10C:
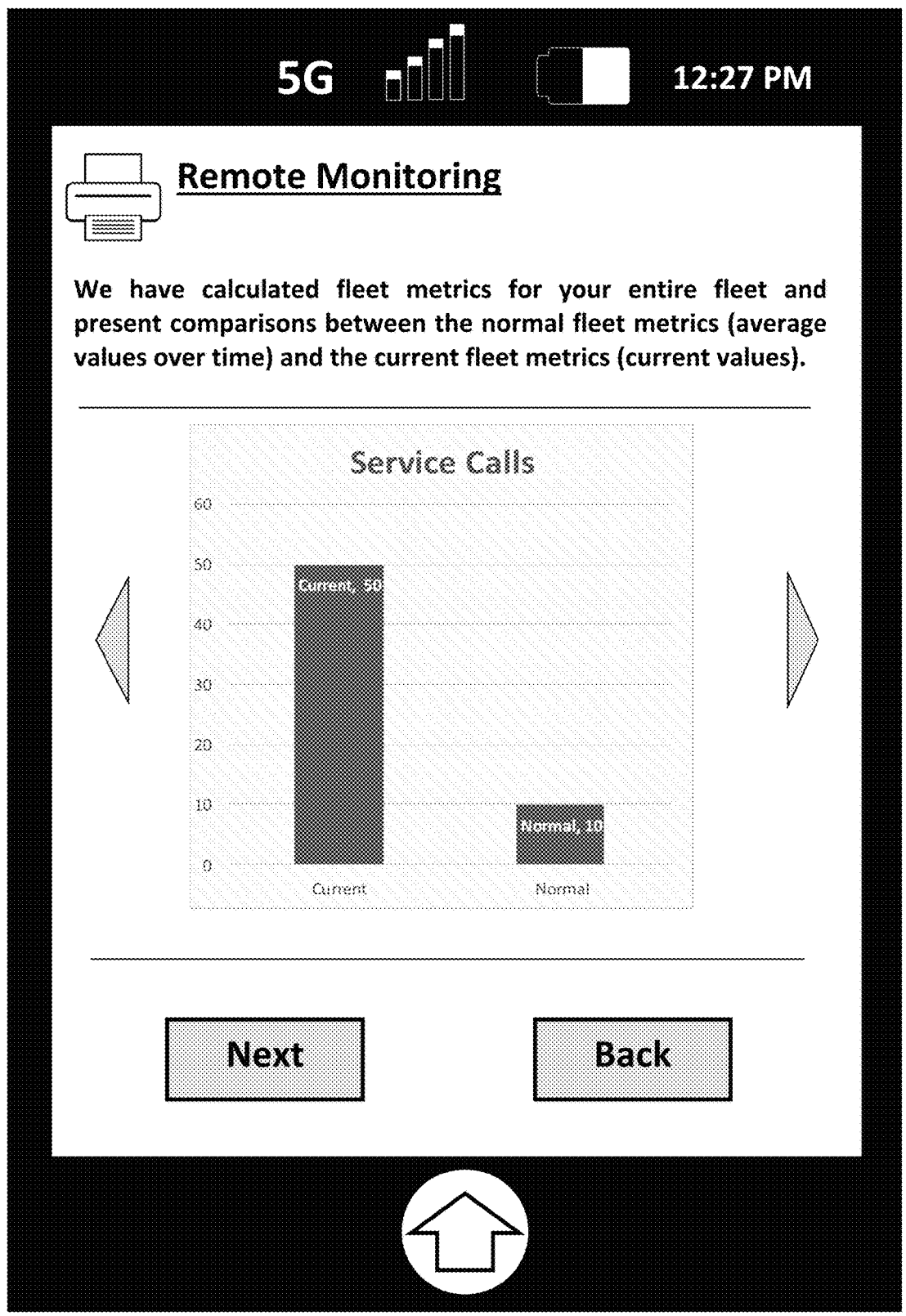
Figure 10D:
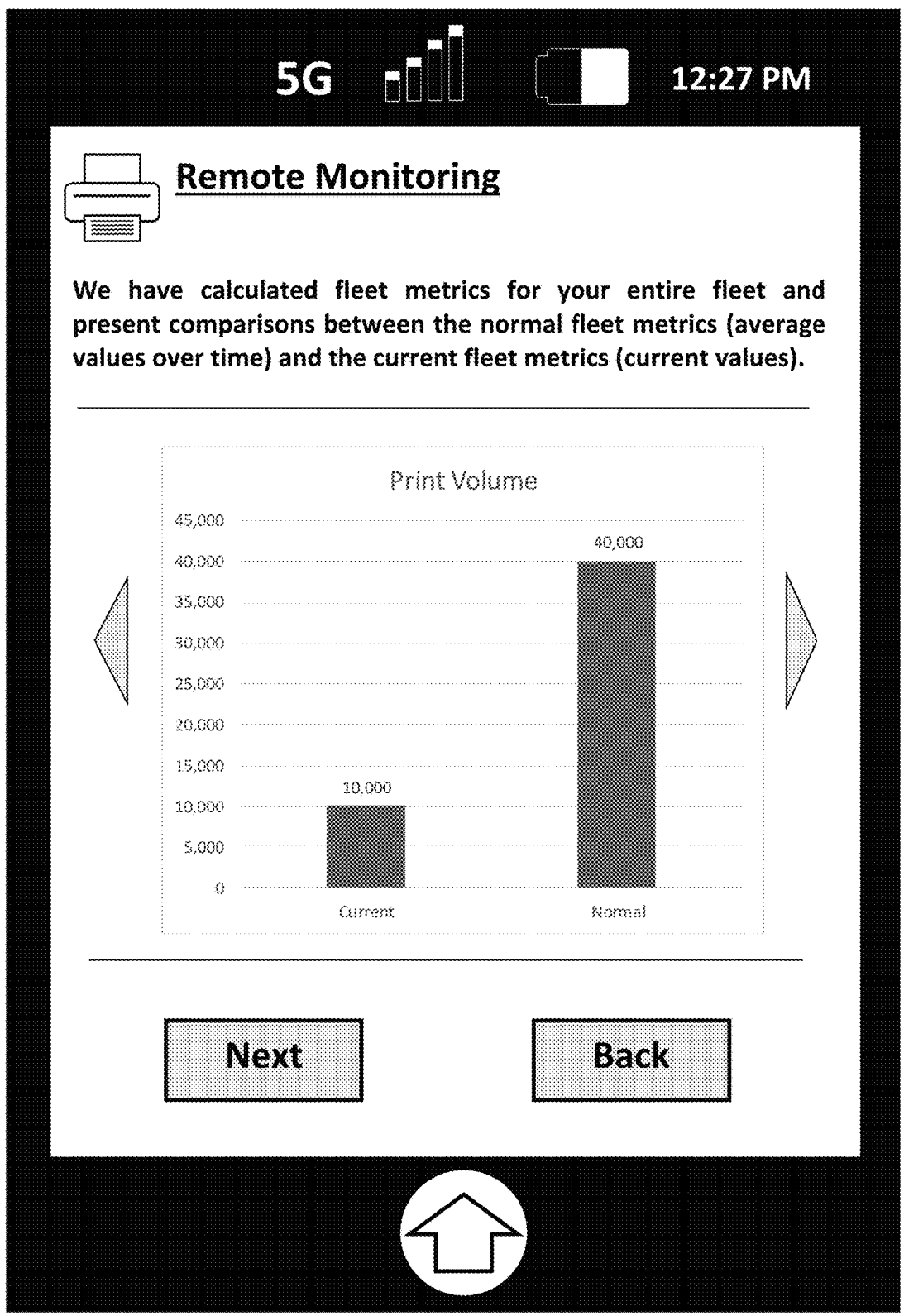
Figure 10E:
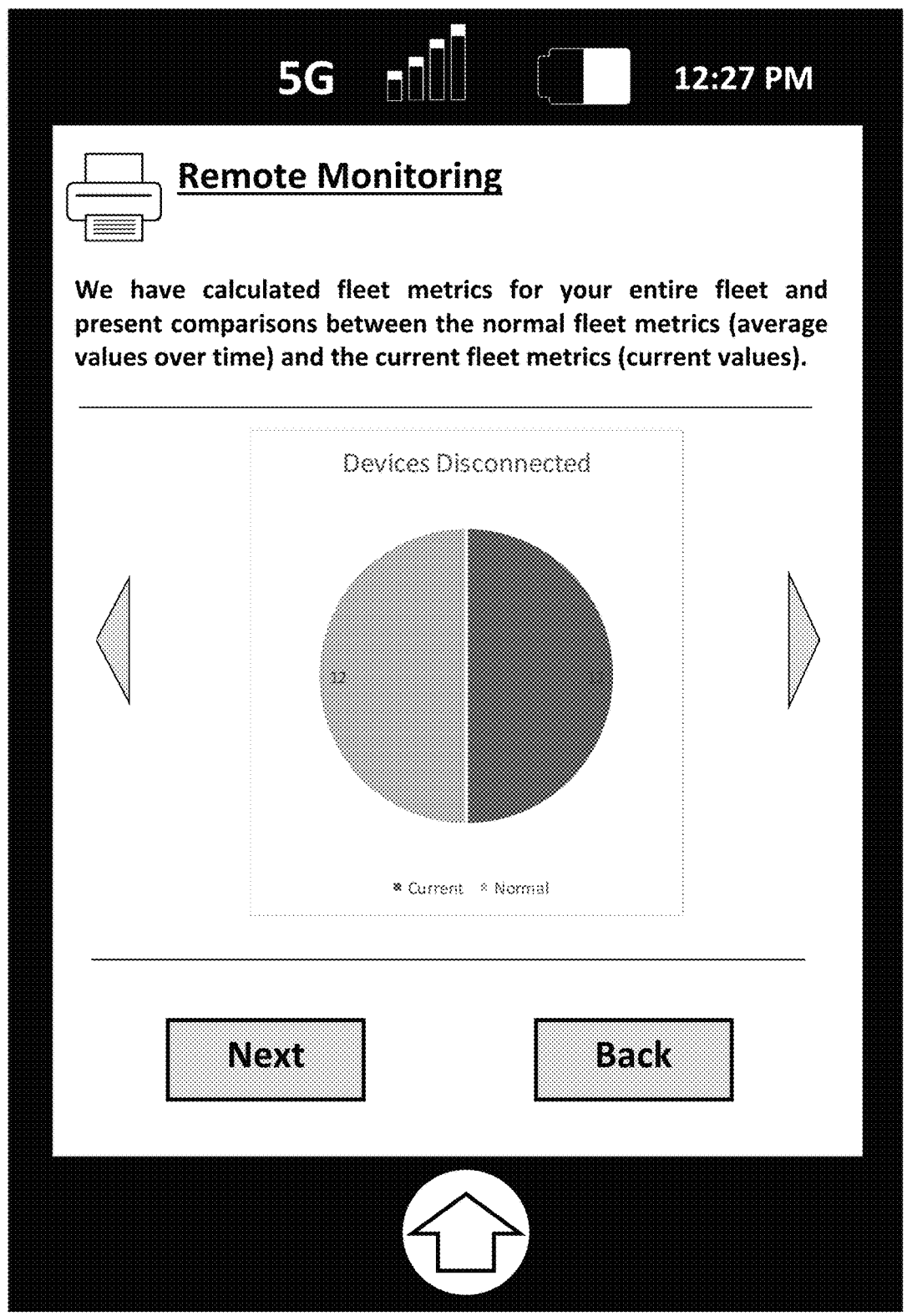

In another embodiment, the device management application may present a graphical chart of each of the fleet metrics individually, such as shown in FIG. 10C. For example, a bar graph of a particular fleet metric (e.g., service calls) comparing the normal state fleet metric to the current state fleet metric may be presented. The user may switch to another fleet metric (but stay on the same screen) by activating the two arrow buttons that are on the left and right side of the screen (i.e. adjacent to the left and right of the graph). For example, by activing the right arrow of the screen illustrating the fleet metric for "service calls", the device management application causes the screen to now present the fleet metric for "print volume" as shown in FIG. 10D The fleet metrics need not always be presented the same way. For example, when the user views each of the fleet metrics individually, each of the fleet metrics may not always be presented in the same form. In the example shown in FIG. 10D, when the user activates the right arrow button, the device management application presents a fleet metric for "devices disconnected", as shown in FIG. 10E. However, unlike the previous fleet metrics (i.e. "service calls" and "print volume"), the fleet metric for "devices disconnected" is presented in a pie chart form. The reason for why each of the fleet metrics may be presented using different charts (and not all the same ones) is that it may be more advantageous to present a fleet metric in one format over another in terms of information presentation.

In yet another embodiment, the dashboard gauge may be manipulated by the user of the client terminal to present information in a format that is preferred or needed by the user. For example, the user may instruct the device management application to present only the normal state fleet metrics. In another example, the user may instruct the device management application to present only the current state fleet metrics. In yet another example the user may instruct device management application to present difference values between the normal state fleet metrics and the current state fleet metrics.

After presenting the dashboard gauge, the device management application may also include within the dashboard gauge a way for the user to view information regarding the specific aspects of the fleet that have substantially changed corresponding to particular fleet metrics (S904). For example, the device management server may have determined, via the normal state fleet metrics and the current state fleet metrics, that (i) the print volume corresponding to the fleet has substantially changed and (ii) the number of service calls has increased to the point where it has caused the fleet to substantially change. In such instance, only fleet metrics that have substantially changed may be presented.

Figure 11:
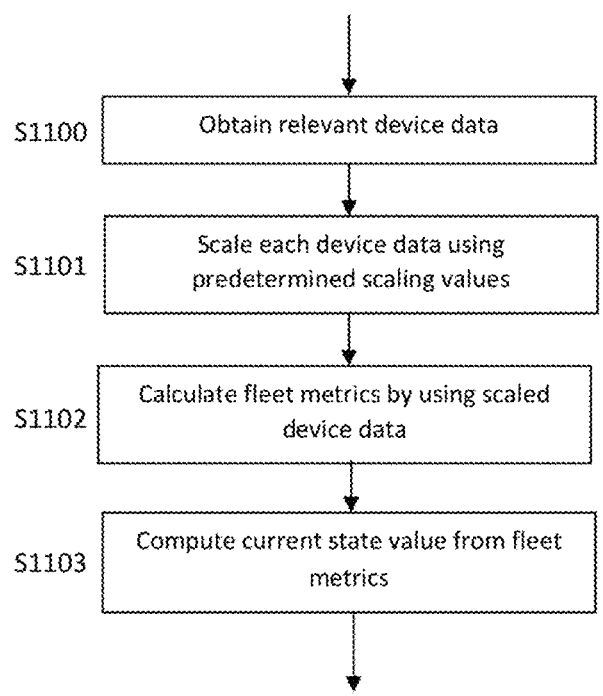
FIG. 11 shows a flow chart of a method that can be performed in any of the systems shown in FIGS. 1A-1D (or an equivalent).

FIG. 11 shows a method that can be performed by or with a device management server (e.g., 201), according to an embodiment.

The fleet metrics may be calculated using device data obtained from each of the output devices. However, the fleet metrics may be in various forms with different units of measurements. In fact some of the fleet metrics may not even have units that correspond to the SI (Systeme International) units, such as service calls or print volume. Accordingly, after the device management server obtains the device data from each of the output devices (S1100), the device management server scales each of the device data according to a predetermined scaling value (S1101). Such predetermined scaling value may be set by an administrator. By performing operations on the predetermined scaling value and the device data, the device management server can obtain one or more scaled device data. Next, the device management server calculates the fleet metrics using the scaled device data (S1102). The operations for calculating the fleet metrics may include averaging the values of the scaled device data over a predetermined (or specified) period of time. Afterwards, the device management server computes the current state value from the fleet metrics (S1103).

The orders in which the steps are performed in the aforementioned methods are not limited to those shown in the examples of FIGS. 5, 7, 9 and 11, and may be switched as long as similar results are achieved. Also, the methods illustrated in the examples of FIGS. 5, 7, 9 and 11 may be implemented using any of the systems described in connection with FIGS. 1A-1D.

The aforementioned specific embodiments are illustrative, and many variations can be introduced on these embodiments without departing from the spirit of the disclosure or from the scope of the appended claims. In addition, elements and/or features of different examples and illustrative embodiments may be combined with each other and/or substituted for each other within the scope of this disclosure and appended claims.

What is claimed is:

1. A device management system comprising:
   a processor; and
   a non-transitory computer readable medium storing one or more programs of instructions
   executable by the processor to configure said device management system to perform a method comprising:
   (a) retrieving, for a fleet of output devices managed by the device management system, data maintained in a device database of device data for managed devices;
   (b) determining plural fleet metrics of the fleet as a whole, based on one or more of (i) the data maintained in the device database for the fleet of output devices and (ii) data collected from the fleet of output devices;
   (c) determining, based on a comparison of (I) a normal state of the plural fleet metrics
   over a predetermined period of time with (II) a current state of the plural fleet metrics, whether changes to the fleet as a whole or to operations of the fleet as a whole exceed a predetermined alert threshold; and
   (d) generating, and outputting to a predetermined notification target, upon determining in
   (c) that the changes to the fleet as a whole or to the operations of the fleet as a whole exceed the predetermined alert threshold, an alert notification indicating a need to check the fleet of output devices, and providing, in the alert notification, a user-operable part to request a summary of the changes, by which the predetermined alert threshold was exceeded,
   the current state of each of the plural fleet metrics determined in (b) being an average value of each of said plural fleet metrics since a most recent determination of the plural fleet metrics.

2. The device management system as claimed in claim 1, wherein the device data retrieved in (a) includes, for each output device in the fleet, a print volume of the output device, and the plural fleet metrics include a print volume of the fleet as a whole over a predetermined or specified amount of time.

3. The device management system as claimed in claim 1, wherein the plural fleet metrics determined in (b) include number of devices in the fleet that are newly discovered over a predetermined or specified amount of time.

4. The device management system as claimed in claim 1, wherein the plural fleet metrics determined in (b) include number of devices in the fleet that are newly disconnected over a predetermined or specified amount of time.

5. The device management system as claimed in claim 1, wherein the plural fleet metrics determined in (b) include number of service calls corresponding to one or more devices in the fleet.

6. The device management system as claimed in claim 1, wherein the plural fleet metrics determined in (b) include:
   (b1) a print volume of the fleet as a whole over a predetermined or specified amount of time;
   (b2) number of devices in the fleet that are newly discovered over a predetermined or specified amount of time;
   (b3) number of devices in the fleet that are newly disconnected over a predetermined or specified amount of time; and
   (b4) number of service calls corresponding to one or more devices in the fleet, and
   wherein the determination in (c) of whether changes to the fleet as a whole or to operations of the fleet as a whole exceed the predetermined alert threshold is based on a selected combination of the plural fleet metrics including (b1), (b2), (b3) and (b4).

7. The device management system as claimed in claim 1, wherein the normal state of each of said plural fleet metrics determined in (b) is an average value of each of said plural fleet metrics over said predetermined period of time.

8. The device management system as claimed in claim 1, wherein the predetermined notification target is a host terminal hosting a device management application, and the device management application provides an application user interface on the client host terminal, and upon determination in (c) that the changes to the fleet or to the operations of the fleet exceed the predetermined alert threshold, the alert notification is pushed in (d) to the device management application, and the application user interface displays the alert notification on the host terminal.

9. The device management system as claimed in claim 8, wherein the device management system includes a device management server, and the device management server transmits the plural fleet metrics to the device management application, when the device management application is connected to the device management server, and provides, via the application user interface provided on the host terminal, a dashboard gauge showing the current state of the plural fleet metrics as compared to the normal state of said plural fleet metrics.

10. The device management system as claimed in claim 1, further comprising:
   transmitting the plural fleet metrics to a client terminal hosting a device management application, when the client terminal is connected to the device management server; and
   providing, via the application user interface provided on the client terminal, a dashboard gauge showing a difference between the current state of the plural fleet metrics and the normal state of said plural fleet metrics as compared to the predetermined alert threshold.

11. A device management system comprising:
   a device management server including a processor; and
   a non-transitory computer readable medium storing one or more programs of instructions executable by the processor to configure said device management server to perform a method comprising:
   (a) retrieving, for a fleet of output devices that provide printing services and are managed by the device management system, data maintained in a device database of device data for managed devices;
   (b) determining plural fleet metrics of the fleet as a whole, based on one or more of (i) the data maintained in the device database for the fleet of output devices and (ii) data collected from the fleet of output devices;
   (c) determining, based on a comparison of (I) a normal state of the plural fleet metrics over a predetermined period of time with (II) a current state of the plural fleet metrics, whether changes to the fleet as a whole or to operations of the fleet as a whole exceed a predetermined alert threshold; and
   (d) providing, via a device management application hosted on a client terminal to communicate with the device management server, an application user interface on the client terminal, and upon determining in (c) that the changes to the fleet as a whole or to the operations of the fleet as a whole exceed the predetermined alert threshold, pushing to the device management application an alert notification indicating a need to check the fleet of output devices, and causing the application user interface to display the alert notification on the client terminal and to provide a user-operable part to request a summary of the changes, by which the predetermined alert threshold was exceeded,
   the current state of each of the plural fleet metrics determined in (b) being an average value of each of said plural fleet metrics since a most recent determination of the plural fleet metrics.

12. The device management system as claimed in claim 11, wherein in (d), upon the device management application communicating with the device management server, the device management server pushes the plural fleet metrics to the device management application; and provides, via the application user interface provided on the client terminal, a dashboard gauge showing the current state of the plural fleet metrics as compared to the normal state of said plural fleet metrics.

13. The device management system as claimed in claim 11, wherein in (d), upon the device management application communicating with the device management server, the device management application downloads the plural fleet metrics from the device management server, and provides, via the application user interface, a dashboard gauge showing the current state of the plural fleet metrics as compared to the normal state of said plural fleet metrics.

14. The device management system as claimed in claim 11, further comprising:
   a device data collection apparatus that collects data from the output devices, and based on a schedule or on demand, updates the data in the device database based on the collected data or transmit the collected data to the device management server.

15. The device management system as claimed in claim 11, wherein each output device in the fleet includes an embedded module hosted on the output device to collect device data and based on a schedule or on demand, upload the collected data to the device database or transmit the collected data to the device management server.

16. A method performed by a device management system including a device management server, the method comprising:
   (a) retrieving data maintained in a device database of device data for a fleet of plural output devices that provide printing services and are managed by the device management system;
   (b) determining plural fleet metrics of the fleet as a whole, based on one or more of (i) the data maintained in the device database for the fleet of output devices and (ii) data collected from the fleet of output devices; and
   (c) determining, based on a comparison of (I) a normal state of the plural fleet metrics over a predetermined period of time with (II) a current state of the plural fleet metrics, whether changes to the fleet as a whole or to operations of the fleet as a whole exceed a predetermined alert threshold; and
   (d) generating, and outputting to a predetermined notification target, upon determining in (c) that the changes to the fleet as a whole or to the operations of the fleet as a whole exceed the predetermined alert threshold, an alert notification indicating a need to check the fleet of output devices, and providing, in the alert notification, a user-operable part to request a summary of the changes, by which the predetermined alert threshold was exceeded,
   the current state of each of the plural fleet metrics determined in (b) being an average value of each of said plural fleet metrics since a most recent determination of the plural fleet metrics.

17. The method as claimed in claim 16, wherein the predetermined notification target is a device management application hosted on a client terminal, and the method further comprises:
   pushing an alert notification to the device management application hosted on the client terminal, when it is determined in (c) that the changes to the fleet or to the operations of the fleet exceed the predetermined alert threshold, to cause an application user interface provided by the device management application on the client terminal to display the alert notification on the client terminal.

18. The method as claimed in claim 16, further comprising:
providing, upon a device management application hosted on a client terminal communicating with the device management server, the plural fleet metrics, a dashboard gauge in the device management application, to show a difference between the current state of the plural fleet metrics and the normal state of said plural fleet metrics as compared to the predetermined alert threshold.

* * * * *